Feb. 26, 1963 H. J. TISCHLER 3,079,199
CONTROL MECHANISM FOR RECLINING SEAT BACK
Filed Jan. 23, 1961 2 Sheets-Sheet 1
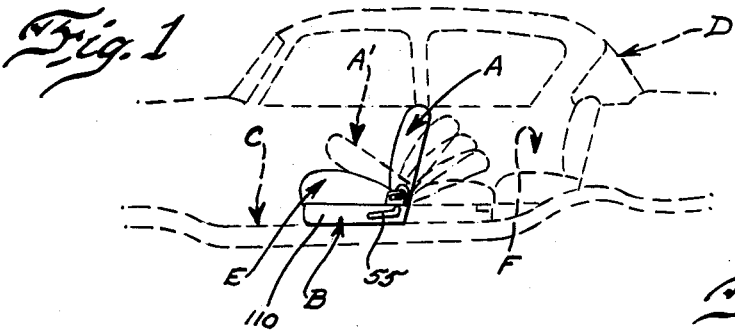
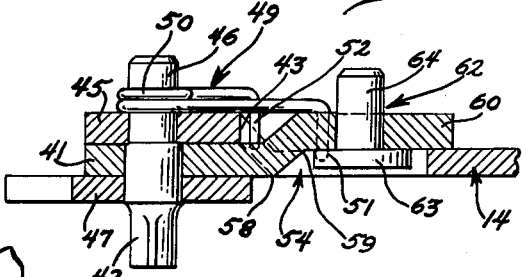
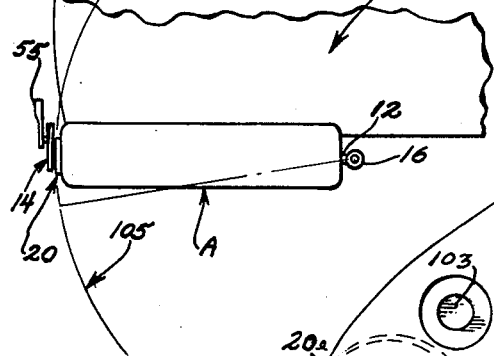
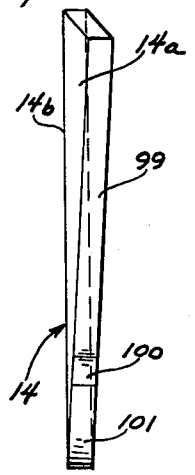
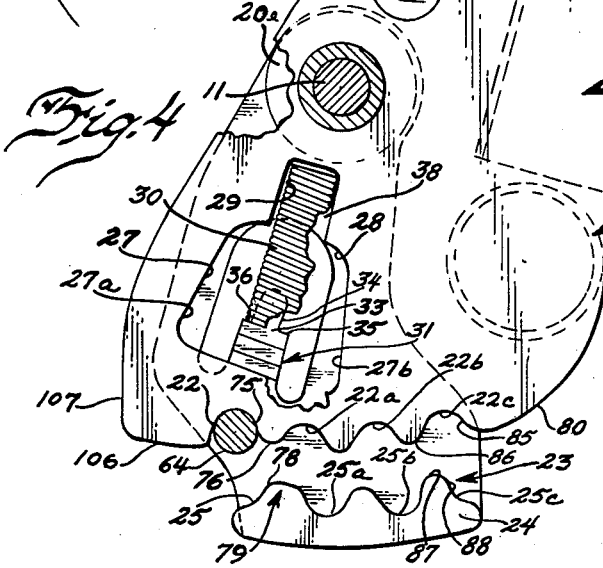
INVENTOR.
HENRY J. TISCHLER
BY
ATTORNEY Feb. 26, 1963  H. J. TISCHLER  3,079,199
CONTROL MECHANISM FOR RECLINING SEAT BACK
Filed Jan. 23, 1961  2 Sheets-Sheet 2
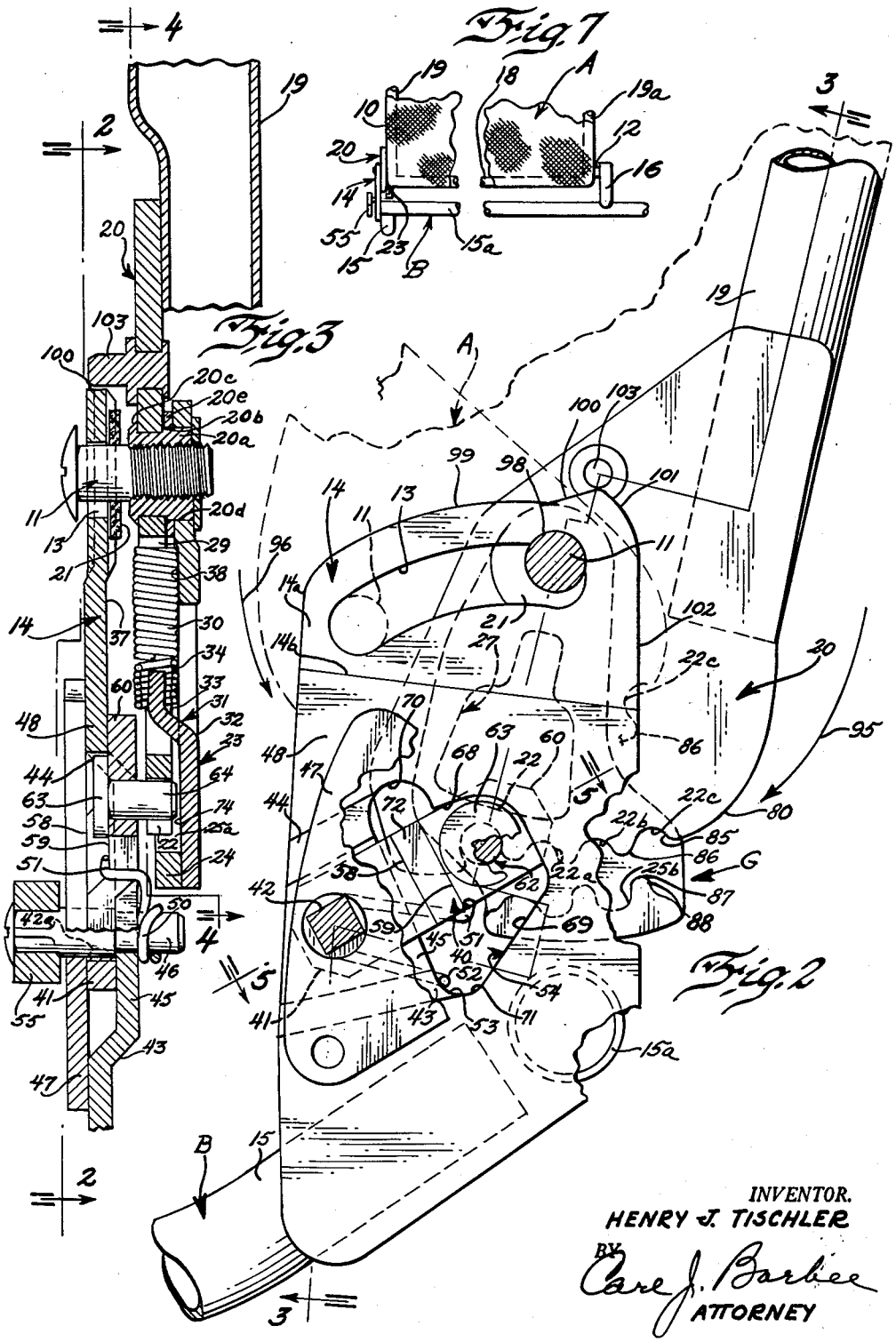
INVENTOR.
HENRY J. TISCHLER
BY
Carl J. Barbee
ATTORNEY United States Patent Office 3,079,199
Patented Feb. 26, 1963

3,079,199
CONTROL MECHANISM FOR RECLINING
SEAT BACK
Henry J. Tischler, Bloomfield Hills, Mich., assignor, by mesne assignments, to American Motors Corporation, Detroit, Mich., a corporation of Maryland
Filed Jan. 23, 1961, Ser. No. 84,011
7 Claims. (Cl. 297—367)

The invention relates to seat backs of the type employed in an automobile which can be adjusted from an upright sitting position to a horizontal or "bed" position and to several selected intermediate positions of reclination. The invention has further reference to a seat back of the type which can be swung forwardly from upright sitting position for the purpose of facilitating entry into the rear passenger compartment of an automobile.

The invention has particular reference to the control mechanism which is employed during the raising or lowering of the seat back wherein portions of such mechanism are shifted forwardly to an out-of-the-way position when the seat back is swung forwardly for passenger entry purposes.

The principal object of the invention, then, is to provide in a control mechanism of the type hereinbefore described, means for forward shifting of a portion of such mechanism to provide additional passenger entry room.

A specific object is to provide for forward shifting of one of the hinge pintles of the hinge portion of the control mechanism and to provide means to lock the pivot position of such pintle under certain conditions of seat back reclination.

Other objects and advantages of the invention will be apparent from the ensuing specification and appended drawings in which:

FIG. 1 is a side elevational view on a reduced scale of a seat assembly for an automobile employing the novel control mechanism and illustrating in dotted lines how the seat back is lowered rearwardly to a horizontal position and also illustrating in dotted lines how it is swung forwardly for facilitating passenger entry.

FIG. 2 is a fragmentary side elevational detail view of the mechanism shown in FIG. 1, the view being taken on the line 2—2 of FIG. 3.

FIG. 3 is a fragmentary sectional view taken on the irregular line 3—3 of FIG. 2.

FIG. 4 is a fragmentary detail view taken on the line 4—4 of FIG. 3.

FIG. 5 is a fragmentary sectional detail view taken on the line 5—5 of FIG. 2.

FIG. 6 is a plan view on a reduced scale showing one of the seat backs and showing a portion of the front seat cushion.

FIG. 7 is a fragmentary detail rear view on a reduced scale of one of the seat backs and its supporting frame.

FIG. 8 is a detail plan view of the bracket which is anchored to the seat cushion carrying frame.

In general, the invention contemplates a seat assembly in which the seat back A is hingedly carried on a seat frame B which is supported on the floor C of an automobile D—the seat back being capable of being lowered in successive steps to the horizontal position as shown in dotted lines in FIG. 1 and of being swung forwardly against the seat cushion E as also shown in dotted lines in FIG. 1. The seat back, at one of its ends 10, is carried on a hinge pin 11 and at its other end is carried on a second hinge pin 12. The hinge pin 11 projects through the elongated arcuate slot 13 of support bracket 14 and is carried by such bracket. The support bracket 14 in turn is rigidly secured to the seat frame members 15 and 15a. The hinge pin 12 is secured to and carried by a suitable support pillar 16 which may be anchored to the seat frame member 15a. Thus the seat back may be swung from upright position (as shown in solid lines in FIG. 1) to any of several intermediate reclining positions and then on to a horizontal or "bed" position (as shown in FIG. 1 in dotted lines) or the seat back may be swung forwardly for increasing the entry room for passengers desiring to enter the rear compartment F (as shown also in FIG. 1 in dotted lines as indicated by the leter A'). The lowering of the seat back is subject to the actuation of the control mechanism, identified generally by the letter G as shown in detail in FIGS. 2, 3, 4 and 5.

The seat frame, as previously pointed out, may include the rear frame member 15a and spaced side members 15 (only one of these being shown in FIGS. 2 and 7) and the seat back may include a lower frame member 18 and spaced upright frame members 19 and 19a at opposite ends of the seat back.

Referring to FIGS. 2 and 3 the support bracket 14 has its inner face secured as by welding, to the frame members 15 and 15a and the seat back carrying bracket 20 has its inner face secured as by welding, to the seat back frame members 18 and 19. As previously mentioned, the hinge pin 11 projects through the slot 13 in support bracket 14 and is threadedly received in the bushing 20a which is anchored in the seat back carrying bracket 20 between the annular shoulder 20b and the swaged flange 20c. The pin 11, while threaded into the bushing, is free for rotative movement with reference thereto. The bracket 20 may be in the form of a stamping provided at its underneath edge with a succession of notches 22, 22a, 22b and 22c for reasons to be explained hereinafter. An indexing bracket 23 is rotatably carried on the annular shoulder 20d of bushing 20a and is free for swinging movement relative to the seat back carrying bracket 20 within certain limits. A washer 20e serves to properly space the indexing bracket from the bracket 20. A washer 21 fabricated with oil impregnated material is carried on pin 11 between the bushing 20a and the side wall of bracket 14 eliminating the need for lubricant at this juncture and facilitating the free swinging movement of the bushing relative to pin 11 and of the indexing bracket relative to the bushing. The indexing bracket has a segment 24 secured to one face thereof and at the lower edge thereof. The segment is provided with notches 25, 25a, 25b and 25c. It will be noted that the segment projects laterally from the side face of bracket 23 so as to underlie the notches in the seat back carrying bracket 20.

Referring to FIG. 4, it will be noted that the seat back carrying bracket 20 is provided with an opening identified generally by the numeral 27 of considerable width at its lower end and tapering to a narrower width at the upper end 28. The extreme upper end of the opening is further narrowed to form a packet 29 for receiving the upper end of a coil spring 30. The indexing bracket 23 has a tongue 31 struck therefrom, such tongue being bent at 32 and bent again at 33 so that the end portion 34 of the tongue lies in the plane of the seat back carrying bracket 20, as best viewed in FIG. 3. The free end 34 of the tongue is narrowed in width so as to project into the interior of the spring 30 and so as to provide the shoulders 35 and 36 against which the lower end of the spring 30 rests. In practice it may be desirable to employ a second coil spring telescopically received within the outer spring 30 for better accomplishing the desired actuation of the indexing bracket, however, such supplementary spring is not shown herein.

The inner face 37 of the upper end of support bracket 14 in conjunction with the inner face 38 of the upper end of the indexing bracket 23 forms the side walls of the pocket into which the upper end of the spring 30 projects.

The range of movement of the indexing bracket (about the axis of pin 11) relative to the seat back carrying bracket is determined by the contacting of the tongue 31 with the opposite side walls 27a and 27b of the opening 27. When pressure is exerted on the indexing bracket causing same to swing about the axis of pin 11, the spring 30 is flexed sideways from the normal rectilinear path of its axis (as shown in FIG. 4) and a release of the pressure on the indexing bracket results in the spring 30 swinging the indexing bracket back to the neutral position as shown in FIG. 4. A more detailed explanation of the functioning of the indexing bracket will be set forth hereinafter.

A latch identified generally by the numeral 40 includes the latch arm which has one end thereof 41 non-rotatably mounted on the pin 42, as by means of a key 42a, the pin being rotatably carried by the support bracket 14 and cover plate 47. The support bracket 14 is bent at 43 and 44 to provide a laterally offset portion 45 through which the free end 46 of the pin 42 projects. The cover plate 47 is secured to the outer face 48 of the support bracket and spans the recessed portion 45 providing a pocket within which the end 41 of the latch arm is movably received. A torsion spring 49 has its eye portion 50 wrapped around the end 46 of the pin 42 and one end 51 of the torsion spring is hooked under the latch arm 40 and the other end 52 is bent to overhang the wall 53 of the opening 54 which is formed in the support bracket 14. Thus the latch arm is continuously urged to swing about the axis of pin 42 upwardly into the position as shown in FIG. 2. The handle 55 is non-rotatably mounted on the end of pin 42 and an upward pull on the handle (as best shown in FIG. 1) rotates the pin 42 and the latch arm 40 so that the latch arm swings downwardly (when viewing FIG. 2). The latch arm is bent at 58 and bent again at 59 so that the free end 60 thereof lies in a plane which is laterally offset with reference to the plane of the end portion 41.

A pin identified generally by the numeral 62 is secured to the latch arm and has an enlarged head portion 63 at one end and a shank portion 64 at the other end which functions as the latch element or pawl as will be explained more fully hereinafter. The support bracket 14 is provided with the irregularly shaped opening 54 which has the opposing wall portions 68 and 69 which are contacted by the head portion 63 of the latch arm pin for limiting the swinging movement of the latch arm about the axis of pin 42 (to be explained more fully hereinafter). The extended portions 70 and 71 of the opening 54 accommodate the bent portion 72 of the latch arm during the swinging thereof. The free end of the shank portion 64 of pin 62 terminates short of the inner face 74 of the indexing bracket and is alternately received in one of the notches in the seat back carrying bracket or one of the notches of the segment 24 during actuation of the latch arm.

The elongated slot 13 in bracket 14 extends in an arcuate path generated on a radius from an axis which is situated in the area of the latch pin 62 so that during shifting movement of the hinge pin 11 within the length of the slot 13, the latch pin 62 will be appropriately situated with reference to the notches in the indexing bracket and the notches in the seat back carrying bracket. The upper end of slot 13 has a laterally offset arcuate recess 98—such arc being substantially common with the cylindrical outer surface of the pin 11. The reason for the offset recess will be explained hereinafter. The upper edge 99 of the bracket 14 is generally arcuate—the arc being generated from the same axis as the arc of slot 13. At the rearward end of the edge 99 a ramp 100 is formed leading to a curved rear wall portion 101 which in turn terminates with the straight rear wall 102. The arc of the curved surface 101 is generated from the same axis as the arc of recess 98. A follower pin 103 is anchored to bracket 20 and projects outwardly therefrom so as to overlie the upper edge of bracket 14. When the seat back is in normal upright sitting position, as shown in FIG. 2, the engagement of the follower pin 103 with the ramp portion 100 causes the hinge pin 11 to be raised slightly so as to enter the recess 98. Thus, during the downward movement of the seat back A toward "bed" position the follower pin 103 rides along surface 101 and the hinge pin 11 is "locked" at the upper end of slot 13 even though it is dropping gradually as a result of gravity out of the recess 98. Thus the hinge pin 11 is prevented from moving forwardly in slot 13 during reclining movement of the seat back, assuring that the latch pin 62 will be in proper position with reference to the sets of notches in the indexing bracket and in the seat back carrying bracket during reclination. When the seat back is swung forwardly toward the seat cushion E, the follower pin 103 travels down the ramp 100 permitting the hinge pin 11 to drop by gravity out of the recess 98 and permitting the shifting of such pin to the forward end of slot 13 (as indicated in dotted lines in FIG. 2). As the pin shifts forwardly in slot 13, the lower ends of the seat back carrying bracket and the indexing bracket move forward considerably so as not to project as far into the rear passenger compartment as they would otherwise project if the hinge pin 11 did not shift forwardly.

Since the seat back A is hingedly carried on hinge pins 11 and 12 and since pin 12 is a fixed pivot, the seat back when swung forwardly against the seat cushion moves in an arcuate path about the vertical axis of support 16 (such path being indicated by the numeral 105 as shown in FIG. 6). While hinge pin 12 is a fixed pivot, it will be understood that its connection with support 16 is such as to permit the arcuate swinging movement of the seat back about the vertical axis provided by support 16. To accommodate the arcuate movement of the seat back, the upper end portion 14a of the bracket 14 is bent slightly along the bend line 14b (as shown best in FIG. 8) so that the follower pin 103 will always overlie the upper edge 99 thereof and so as to assure that there will be no interference between brackets 14 and 20 as the seat back is swung forwardly.

*Operation*

Assuming that the seat back is in the upright position as shown in solid lines in FIG. 1 and as shown in FIGS. 2 and 4, then the latch element 64 will be received within notch 22 of the seat back carrying bracket under the influence of spring 49. The position of the seat back is inclined slightly from the vertical and gravity is tending to cause the seat back to swing rearwardly toward the horizontal position—this, however, being prevented because of the engagement of the rear wall 75 of notch 22 bearing against the latch element 64. Since the movement of the seat back is always in an arcuate path generated from the horizontal axes of the hinge pins 11 and 12, it is necessary that the configuration and position of the rear wall of notch 22 (as well as the rear walls of the succeeding notches in the seat back carrying bracket) be such with reference to a line drawn through the axes of pins 42 and 62 and with reference to the line of force 95 that the axis of latch element 64 will be beyond "dead center" so that when an occupant of the seat leans back against the seat back, the latch element will not be pushed out of the notch 22. Instead, the seat back carrying bracket (under the load of the seat occupant) will be tending to force the latch arm still further upwardly about the axis of pin 42—any possible further upward movement of the latch arm, being prevented by the engagement of the head portion 63 with the support bracket wall 68. It will be noted that the load imposed on the seat back by the seat occupant is absorbed entirely at that end of the seat back where the control mechanism G is located, since the other end of the seat back is freely hinged on the hinge pin 12.

If it is desired to lower the seat back to the second station of reclination, then the seat occupant grasps handle 55 exerting an upward pull on same (it is also desirable that the seat occupant lean forwardly so as to remove the load on the seat back prior to exerting the upward pull on handle 55). This causes the latch arm 40 to swing downwardly until the latch element 64 is received in the notch 25 of the indexing bracket 23. As soon as the latch element is clear of the peak 76 of the tooth which is formed between the successive notches 22 and 22a, then the seat back is free, under the influence of gravity to continue swinging rearwardly and downwardly until the tongue 31 is engaged by the bracket wall 27b. The latch element 64 being received in notch 25, causes the indexing bracket to remain stationary while the seat back continues swinging rearwardly within the range of movement permitted by the span of the opening 27 (that is, until wall 27b engages tongue 31). At this stage the spring 30 has been flexed sideways and the peak 76 has moved sufficiently far forwardly with reference to the leading corner 78 of tooth 79 to permit the latch element 64 to proceed into the second notch 22a when the manual lifting pressure on handle 55 is released (the spring 49, of course, causing the latch arm to spring upwardly again until the latch element is received within notch 22a).

Viewing FIG. 4, it will be noted that the diameter of the latch element 64 is greater than the gap between tooth peak 76 and the peak of tooth 79, thereby necessitating swinging movement of the indexing bracket to permit the gap to become great enough for the latch element to proceed into the second notch 22a. After the latch element has proceeded into notch 22a, then the spring 30 causes the indexing bracket to swing about the axis of pin 11 back to the neutral position as shown in FIG. 4, whereupon the notch 25a will be in an appropriate position to permit the latch element to enter same upon the next upward application of pressure on handle 55.

When the latch element 64 has reached the fourth station represented by notch 22c, then the next application of upward pressure on handle 55 will cause the latch element to ride along the arcuate edge 80 of the seat back carrying bracket until the seat back is in full horizontal position, as shown in dotted lines in FIG. 1. Any upward pressure on the handle 55 at this time would simply cause the head portion 63 of the latch element to engage wall 69 of the support bracket. Consequently, the latch arm with its latch element is always in proper position for co-acting with the notches in the seat back carrying bracket and the notches in the indexing bracket because of the limited range of swinging movement of the latch arm assured by the walls 68 and 69 in cooperation with the latch element head 63. In raising the seat back from horizontal position to the upright position shown in FIG. 1, it is only necessary to grasp the upper end of the seat back and manually pull upwardly on same while the latch element 64 ratchets back and forth between the sets of notches. No attention is given to the handle 55 when raising the seat back from horizontal to upright position.

During the upward movement of the seat back, the action of the latch arm is as follows. The latch element 64 follows the arcuate edge 80 until it pops into notch 22c (under the influence of spring 49). Continued upward pressure on the seat back then causes the forward wall 85 of notch 22c to commence forcing the latch element out of said notch. The position and configuration of the forward wall of each of the notches 22, 22a, 22b and 22c is such with reference to the axes of pins 42 and 62 and with reference to the line of force 96 that the axis of latch element 64 is below "dead center" whereby upward pressure on the seat back causes the latch element to automatically pop out of the successive notches. As the latch element is coming out of 22c, the gap between the peak 86 and peak 87 is normally insufficient to permit passage of the latch element thereby causing the latch element to engage the peak 87 (toward the rearward corner 88 thereof) and the indexing bracket is swung forwardly about the axis of pin 11 until the tongue 31 engages the forward wall 27a of the opening in the seat back carrying bracket. At this stage, the peak 86 has moved sufficiently far rearwardly with reference to peak 87 that the gap is large enough to permit the latch element to pass over the peak 86 and on into notch 22b. At this stage, the indexing bracket is free of the latch element and swings (under the inducement of spring 30) back to the neutral position as shown in FIG. 4. Continued upward pressure on the seat back causes the latch element to swing back and forth between the sets of notches, automatically, until the latch element reaches notch 22.

In the instant application, it is desirable that the seat back be capable of being swung forwardly against the seat cushion E for facilitating passenger entry into the rear passenger compartment of the vehicle. Thus the configuration of the lower edge portion 106 is such as to permit the latch element 64 to ride thereover and then to proceed along the front edge 107 until such time as the seat back engages the seat cushion. As has been previously mentioned when the seat back is being swung forwardly toward the seat cushion, the hinge pin 11 drops downwardly, due to gravity out of the recess 98 (such action being permitted after the follower pin 103 has completed its trip down the ramp 100 and continued forward swinging of the seat back causes the hinge pin 11 to move to the forward end of slot 13. Under these conditions the lower portions of the seat back carrying bracket (where the notches are located) and the lower portion of the indexing bracket will move upwardly and forwardly for increasing entry room into the rear passenger compartment. In FIG. 2, the approximate position of notch 22c is shown in dotted lines with the hinge pin 11 situated at the forwardmost end of slot 13.

Referring to FIG. 1, I have shown a shield 110 extending alongside the end of the removable seat cushion E and exteriorly of the seat frame B. The shield serves to cover up some of the working parts of the control mechanism (as indicated in FIG. 1) and the details of the shield are not included in the remaining figures of the drawings.

I claim:

1. A seat assembly comprising: a supporting frame forming the base of the seat assembly; a seat back; a first hinge connection at one end of the seat back interconnecting the seat back and supporting frame; a seat back carrying bracket secure with the seat back; a support bracket secure with the frame; a second hinge connection between the seat back carrying bracket and support bracket, said seat back being capable of swinging movement forwardly and rearwardly from upright to reclining position relative to the frame about a substantially horizontal axis provided by the first and second hinge connections; latching mechanism cooperating between said brackets for controlling the raising and lowering of the seat back from upright to reclining position relative to the frame; said second hinge connection having its axis shiftable, whereby the seat back is shifted forwardly about a substantially vertical axis provided by the first hinge connection.

2. A seat assembly as set forth in claim 1 wherein the second hinge connection includes a hinge pin secured to one of the brackets and an elongated slot in the other bracket through which slot the pin projects, whereby the shifting of the pin within the slot effects the shifting of the axis of the second hinge connection.

3. Apparatus as set forth in claim 2 wherein said elongated slot is located in the support bracket and is provided with a laterally off-set recess, and means are provided for causing the hinge pin to be trapped in said recess during swinging movement of said seat back from upright to reclined position.

4. Apparatus as set forth in claim 3 wherein the upper edge of said supporting bracket is arcuately formed with said arc generated from substantially the same axis as the arc of said slot, the rearward end of said edge formed with a ramp which forms part of the means for effecting trapping of the hinge pin in the recess.

5. Apparatus as set forth in claim 4 wherein a follower pin is anchored to said seat back carrying bracket and projects outwardly to overlie said upper edge of said supporting bracket, said follower pin coacting with the upper edge of the support bracket for maintaining said hinge pin in said recess during movement of said seat back to intermittent reclining positions.

6. A seat assembly comprising: a supporting frame forming the base of the seat assembly; a seat back hingedly carried by the frame on hinge members situated at opposite end walls of the seat back, said hinge members having axes lying in a substantially horizontal plane, whereby the seat back swings about a substantially horizontal axis rearwardly from upright to reclined position and forwardly from upright to out-of-the-way position; one of said hinge members including a support bracket secure with the frame and a seat back carrying bracket secure with the seat back, said hinge member also including a hinge pin secured to the seat back carrying bracket; said support bracket having an elongated slot therein through which the hinge pin projects, whereby the hinge pin moves forwardly or rearwardly along with the seat back within the limits of the slot and means associated with the brackets for retaining the hinge pin at one end of the slot during rearward swinging movement of the seat back from upright toward reclined position.

7. A seat assembly as set forth in claim 6 wherein the upper end of the support bracket is inclined with reference to the seat back carrying bracket to assure substantial parallel relationship of the support bracket relative to the seat back carrying bracket during forward shifting of the hinge pin in the support bracket slot.

References Cited in the file of this patent

UNITED STATES PATENTS

| Re. 24,528 | Borisch | Sept. 2, 1958 |
| 2,959,206 | Tedesco | Nov. 8, 1960 |
| 2,972,374 | McKey | Feb. 21, 1961 |

UNITED STATES PATENT OFFICE
CERTIFICATE OF CORRECTION

Patent No. 3,079,199                                            February 26, 1963

Henry J. Tischler

It is hereby certified that error appears in the above numbered patent requiring correction and that the said Letters Patent should read as corrected below.

Column 2, line 55, for "packet" read -- pocket --; column 6, line 22, after "gravity" insert a comma; line 24, after "100" insert a closing parenthesis.

Signed and sealed this 5th day of November 1963.

(SEAL)
Attest:

ERNEST W. SWIDER                              EDWIN L. REYNOLDS

Attesting Officer                                Acting Commissioner of Patents